(12) United States Patent
Nakayama et al.

(10) Patent No.: US 11,091,204 B2
(45) Date of Patent: Aug. 17, 2021

(54) VEHICLE BODY STRUCTURE OF ROOF PANEL AND SIDE PANEL THAT ARE JOINED

(71) Applicant: HONDA MOTOR CO., LTD., Tokyo (JP)

(72) Inventors: Manabu Nakayama, Wako (JP); Kazuki Yoshida, Wako (JP); Kota Shimosato, Wako (JP); Yosuke Saito, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 16/479,429

(22) PCT Filed: Oct. 30, 2017

(86) PCT No.: PCT/JP2017/039033
§ 371 (c)(1),
(2) Date: Jul. 19, 2019

(87) PCT Pub. No.: WO2018/135067
PCT Pub. Date: Jul. 26, 2018

(65) Prior Publication Data
US 2019/0359262 A1    Nov. 28, 2019

(30) Foreign Application Priority Data

Jan. 20, 2017   (JP) .............................. JP2017-008559

(51) Int. Cl.
*B62D 25/06*    (2006.01)
*B62D 27/02*    (2006.01)

(52) U.S. Cl.
CPC ........... *B62D 25/06* (2013.01); *B62D 27/023* (2013.01)

(58) Field of Classification Search
CPC ....... B62D 25/06; B62D 27/023; B62D 27/02
(Continued)

(56) References Cited

U.S. PATENT DOCUMENTS 4,618,181 A * 10/1986 Tokuda ................. B62D 25/07
296/191
5,897,159 A    4/1999 Nagasawa et al.
(Continued)

FOREIGN PATENT DOCUMENTS

DE      102012223549 A1    6/2013
JP      S57-063783 U       4/1982
(Continued)

OTHER PUBLICATIONS

Extended European search report dated Feb. 14, 2020 issued in corresponding EP Patent Application No. 17892195.3.

*Primary Examiner* — Pinel E Romain
(74) *Attorney, Agent, or Firm* — Carrier Blackman & Associates, P.C.; Joseph P. Carrier; William D. Blackman

(57) ABSTRACT

The moldability of a flange part in a terminal angle part of the flange part is improved. A panel joining structure in which one side of a roof panel of a vehicle body and one side of a side panel are continuously joined at a side-edge flange part extending in a vehicle longitudinal direction, wherein: the roof panel and the side panel have vertical wall parts that spread downward from side parts extending in a vehicle width direction in a panel main body; and in a terminal angle part of the continuously joined side-edge flange part, a notch is provided to the vertical wall part of at least one of the roof panel and the side panel.

5 Claims, 7 Drawing Sheets

(58) Field of Classification Search
USPC .......................................................... 296/210
See application file for complete search history.

(56) References Cited

U.S. PATENT DOCUMENTS

| | | | | |
|---|---|---|---|---|
| 6,485,089 | B2* | 11/2002 | Hanyu ................... | B62D 21/15 |
| | | | | 29/897.2 |
| 7,954,886 | B2* | 6/2011 | Kinoshita .............. | B62D 33/06 |
| | | | | 296/193.06 |
| 2008/0030050 | A1* | 2/2008 | Chen ...................... | B62D 25/06 |
| | | | | 296/210 |
| 2013/0320716 | A1* | 12/2013 | Nishimura ............. | B62D 25/06 |
| | | | | 296/210 |

FOREIGN PATENT DOCUMENTS

| | | |
|---|---|---|
| JP | S63-130381 U | 8/1988 |
| JP | H02-108666 U | 8/1990 |
| JP | H08-40307 A | 2/1996 |
| JP | H10-059209 A | 3/1998 |
| JP | 2000-335443 A | 12/2000 |
| JP | 2005-329417 A | 12/2005 |
| JP | 2011-207337 A | 10/2011 |
| JP | 2016-088447 A | 5/2016 |

* cited by examiner

VEHICLE BODY STRUCTURE OF ROOF PANEL AND SIDE PANEL THAT ARE JOINED

TECHNICAL FIELD

The present invention relates to a vehicle body structure of a roof panel and a side panel that are joined.

BACKGROUND ART

For example, JP2005-329417 discloses a joining method according to which a roof panel of a vehicle body and a side panel of the vehicle body are continuously joined to each other by brazing or the like instead of spot welding.

According to the joining method disclosed in JP2005-329417, a bent (flanged) end edge portion of the roof panel is joined to the side panel, which results in one side of the roof panel of the vehicle body and one side of the side panel of the vehicle body being continuously joined to each other. In detail, a space to be filled is formed in the flanged end edge portion of the roof panel and a foaming agent filling the space to be filled foams and is cured. Then, a joined portion of the side panel and a joined portion, of the roof panel, having the space to be filled which has been filled with the foaming agent which has been cured are continuously joined to each other by brazing or the like.

PRIOR ART REFERENCE

Patent Literature

JP2005-329417 discloses the joining method according to which the flanged end edge portion of the roof panel is continuously joined to the side panel by brazing or the like as described above.

SUMMARY OF INVENTION

Technical Problem to be Solved by Invention

However, according to the joining method disclosed in JP2005-329417, for example, it is difficult in some cases to continuously join to the side panel a front end corner portion and a rear end corner portion (end corner portions), of the roof panel, which are to respectively extend in the vehicle front-rear direction and are to constitute a continuous joined portion of the vehicle body. For example, when forming at a main body, of the roof panel, having an end edge portion formed by flange forming, a vertical wall extending downward from a side portion extending in a vehicle width direction, it is difficult to form the end corner portions of a flange portion constituting the continuous joined portion and extending in the vehicle front-rear direction.

Specifically, in a step of forming the roof panel, in a case where each of the end corner portions of the flange portion is bent toward a vehicle front side or a vehicle rear side in order to form the vertical wall, a material of the flange portion is pulled and therefore forming the end corner portions of the flange portion is difficult.

Considering the afore-mentioned points, the present invention has an objective to provide a vehicle body structure of a roof panel and a side panel that are joined, the vehicle body structure which is capable of improving formability of an end corner portion of a flange portion.

Solution to Solve Problem

In order to achieve the objective, the present invention provides a vehicle body structure of a roof panel and a side panel that are joined comprising a roof panel having a roof panel flange portion extending in a vehicle front-rear direction and a roof panel side portion extending in a vehicle width direction and including a roof panel vertical wall extending downward, and a side panel having a side panel flange portion extending in the vehicle front-rear direction and a side panel side portion extending in the vehicle width direction and including a side panel vertical wall extending downward, wherein the roof panel flange portion and the side panel flange portion are continuously joined to each other, and wherein a notch is formed on at least one of the roof panel vertical wall and the side panel vertical wall, and is positioned on end corner portions of the roof panel flange portion and the side panel flange portion that are continuously joined to each other continuously in the vehicle front-rear direction.

Advantageous Effects of Invention

The present invention can provide a vehicle body structure of a roof panel and a side panel that are joined, the vehicle body structure which is capable of improving formability of an end corner portion of a flange portion.

DESCRIPTION OF EMBODIMENTS

Next, an embodiment of the present invention is described in detail with reference to the drawings as appropriate.

Figure 1:
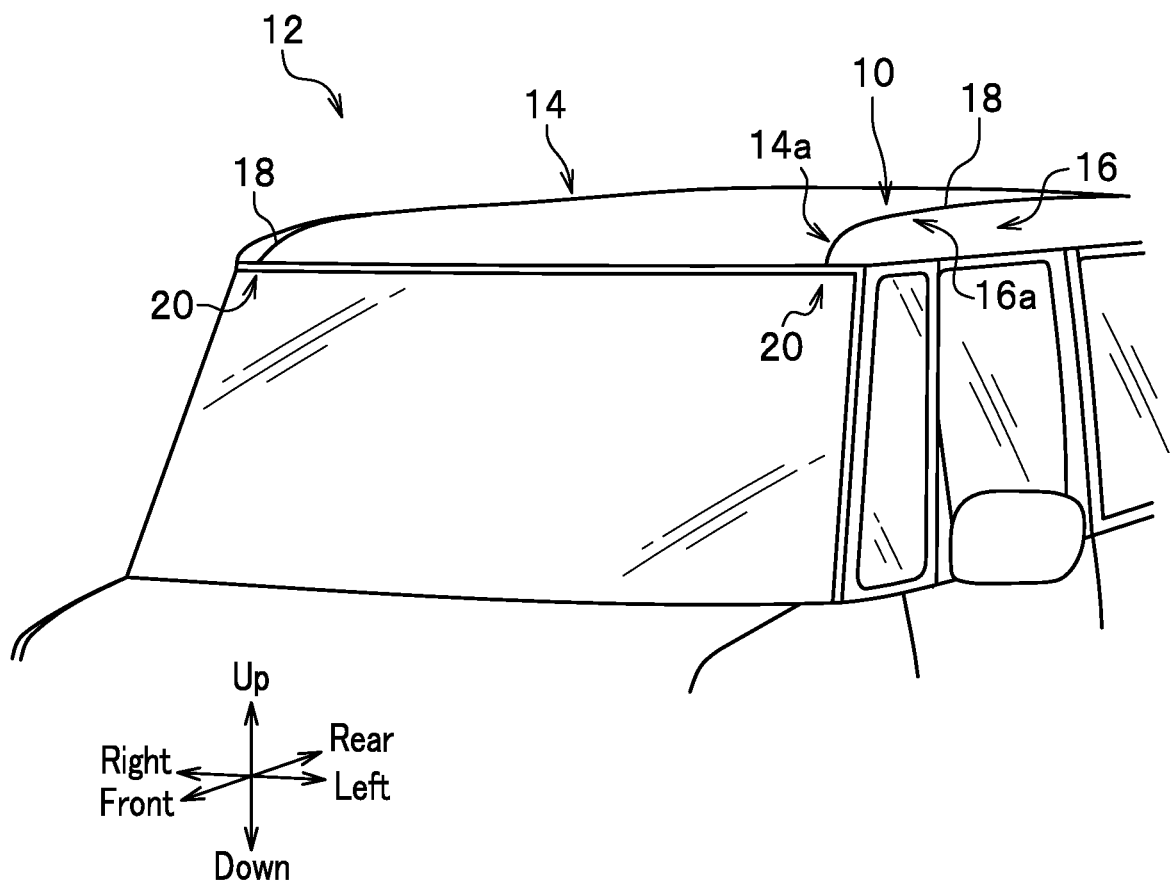
FIG. 1 is a partially omitted perspective view of a vehicle to which the vehicle body structure of a roof panel and a side panel that are joined according to an embodiment of the present invention is applied.

FIG. 1 is a partially omitted perspective view of a vehicle to which the vehicle body structure of a roof panel and a side panel (hereafter, simply referred to as a panel joined structure 10) according to an embodiment of the present invention is applied. In the drawings, "front, rear" refers to a vehicle front-rear direction," "left, right" refers to a vehicle width direction," and "up, down" refers to a vertical up-down direction.

As shown in FIG. 1, the panel joined structure 10 comprises a roof panel 14 and a side panel 16 which constitute a vehicle body 12. The panel joined structure 10 has a continuous joined portion 18 which consists of one side 14a of the roof panel 14 and one side 16a of the side panel 16, and the one side 14a and the one side 16a are joined to each other continuously in the vehicle front-rear direction.

Although continuous joined portions 18 having identical structures are provided respectively on the left and right sides of a roof portion and parallel to each other in a plan view, the continuous joined portion 18 on the left side is described in detail and description of the continuous joined portion 18 on the right side is omitted for ease of explanation.

The one side 14a of the roof panel 14 is a left edge portion extending in the vehicle front-rear direction. The one side 16a of the side panel 16 is adjacent to the one side 14a of the roof panel 14 and is a right edge portion extending in the vehicle front-rear direction.

The panel joined structure 10 has one end corner portion 20 which is an end portion of the continuous joined portion 18 on a vehicle front side and the other end corner portion 20 which is the end portion of the continuous joined portion 18 on a vehicle rear side. In order to form the continuous joined portion 18, continuous joining is performed substantially linearly from the other end corner portion 20 on the vehicle rear side to one end corner portion 20 on the vehicle front side by, for example, brazing with a copper alloy or the like. One end corner portion 20 and the other end corner portion 20 have the identical or substantially the identical configurations. Only one end corner portion 20 on the vehicle front side is illustrated in FIG. 1 and an illustration of the other end corner portion 20 on the vehicle rear side is omitted.

Figure 2:
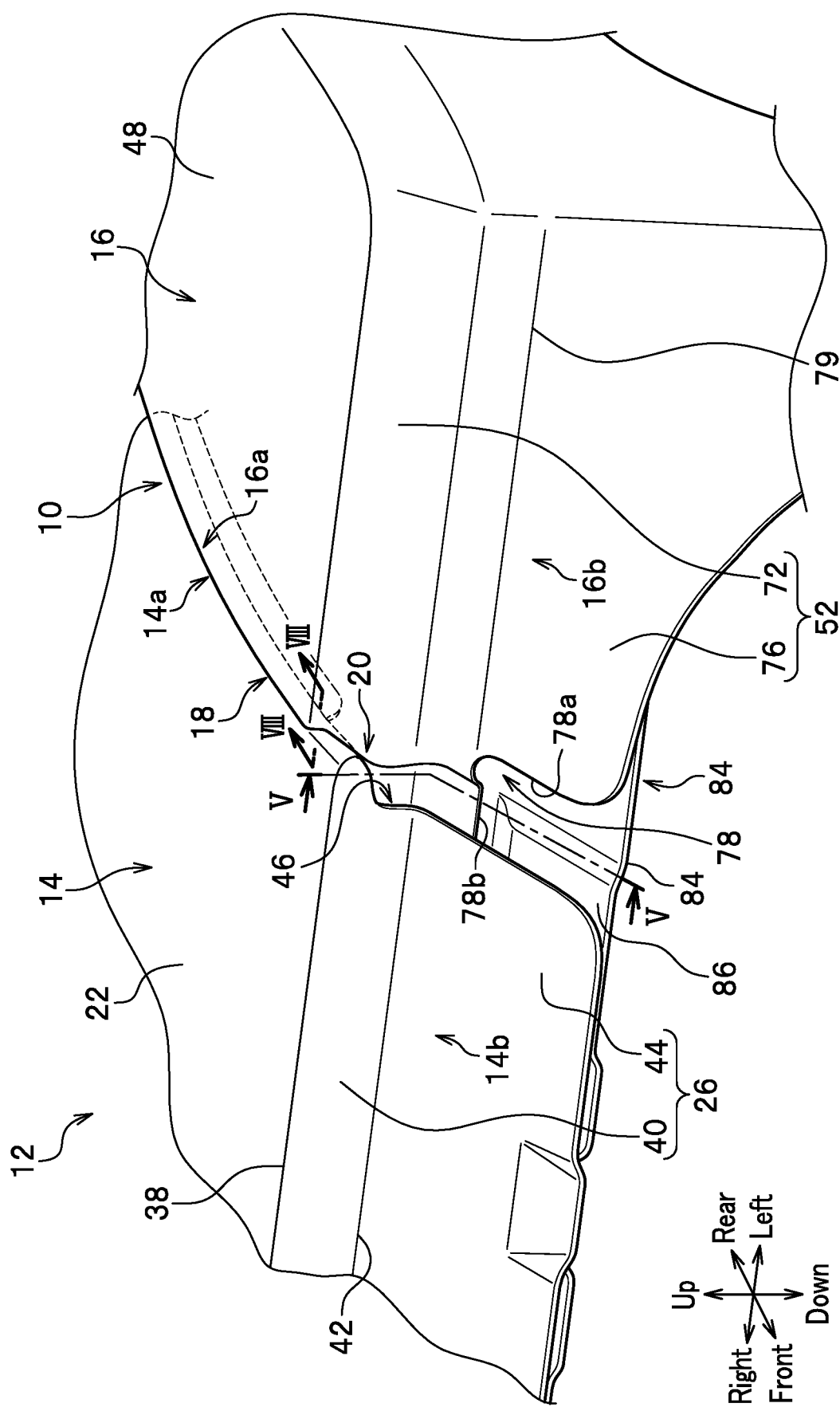
FIG. 2 is a partially enlarged perspective view of a continuous joined portion illustrated in FIG. 1 in order to show one end corner portion.
Figure 3:
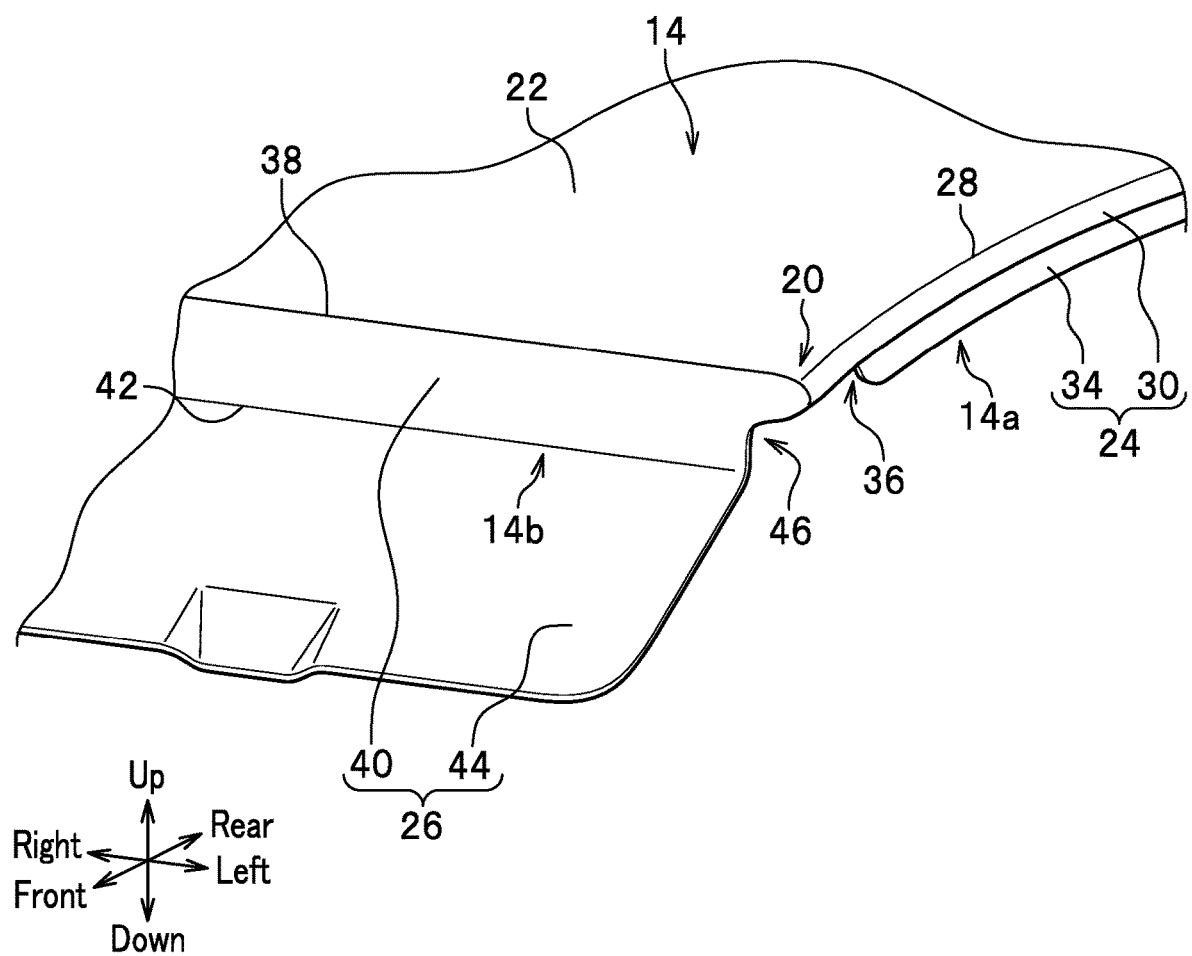
FIG. 3 is a partially omitted perspective view of the roof panel.

As shown in FIG. 2 and FIG. 3, the roof panel 14 has a top plate portion 22, a side edge flange portion 24 formed at the one side 14a of the roof panel 14, and a roof panel side vertical wall portion 26 formed at another side 14b (extending in a vehicle width direction) substantially perpendicular toward the one side 14a.

Figure 8:
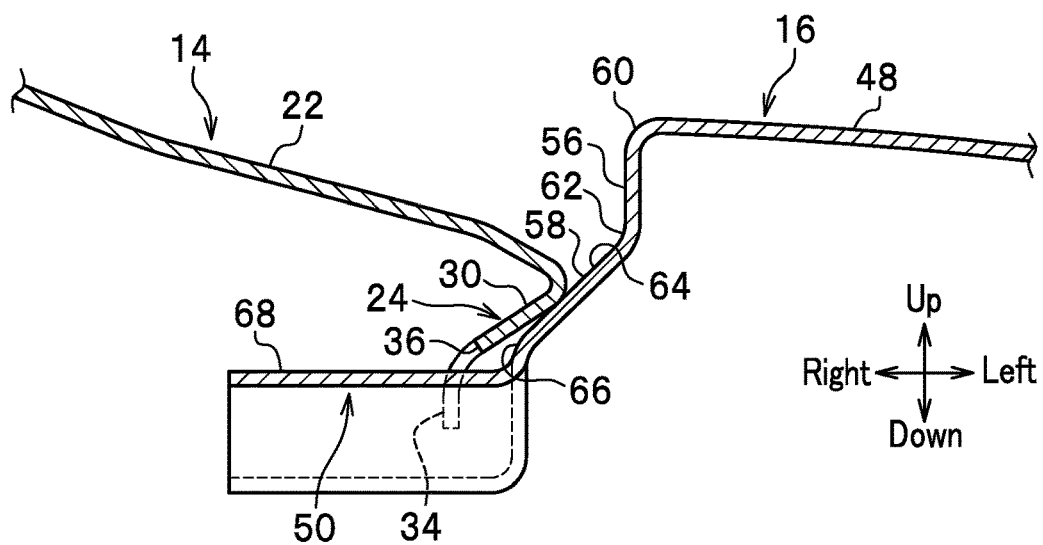
FIG. 8 is a vertical cross-sectional view when the vehicle body structure illustrated in FIG. 2 is cut along the VIII-VIII plane.

The side edge flange portion 24 has a base end portion 30 which extends continuously from the top plate portion 22 through a ridge line 28, an outer edge portion 34 which extends continuously from the base end portion 30, and a side edge flange opening portion 36 which is positioned adjacent to the end corner portion 20. The side edge flange portion 24 is a portion to be continuously joined to the one side 16a of the side panel 16. The base end portion 30 extends downward and inwardly in the vehicle width direction from the top plate portion 22 and is then bent at an acute angle under the top plate portion 22 (see FIG. 8). The outer edge portion 34 extends downward from the base end portion 30 and is then bent under the base end portion 30. The side edge flange portion 24 (base end portion 30, outer edge portion 34) of the roof panel 14 functions as a flange portion which is continuously joined to the one side 16a of the side panel 16 (see FIG. 8).

As shown in FIG. 3, the side edge flange opening portion 36 extends continuously from the base end portion 30 to the outer edge portion 34. The side edge flange opening portion 36 is provided against ductility of the end corner portion 20 made of a steel plate when press forming.

The roof panel side vertical wall portion 26 (hereafter, simply referred to as a vertical wall portion 26) is a portion to which a not-illustrated front windshield is to be attached and is a vertical wall, of a panel main body of the roof panel 14, extending downward from the other side 14b (side portion) extending in the vehicle width direction.

The vertical wall portion 26 has a base end portion 40 which extends continuously from the top plate portion 22 through a ridge line 38, a front edge portion 44 which extends continuously from the base end portion 40 through a ridge line 42, and a roof panel front edge side notch 46. The base end portion 40 extends downward from the ridgeline 38 between the base end portion 40 and the top plate portion 22 and is then bent under the top plate portion 22. The front edge portion 44 is bent under the base end portion 40 and extends forward and downward from the ridgeline 42 between the front edge portion 44 and the base end portion 40.

The roof panel front edge side notch 46 (hereafter, simply referred to as a notch 46) extends continuously from the base end portion 40 to the front edge portion 44 and is formed by partially cutting away a left edge portion formed at the other side 14b of the roof panel 14. The notch 46 extends continuously from the side edge flange opening portion 36 and is formed on the end corner portion 20.

Figure 4:
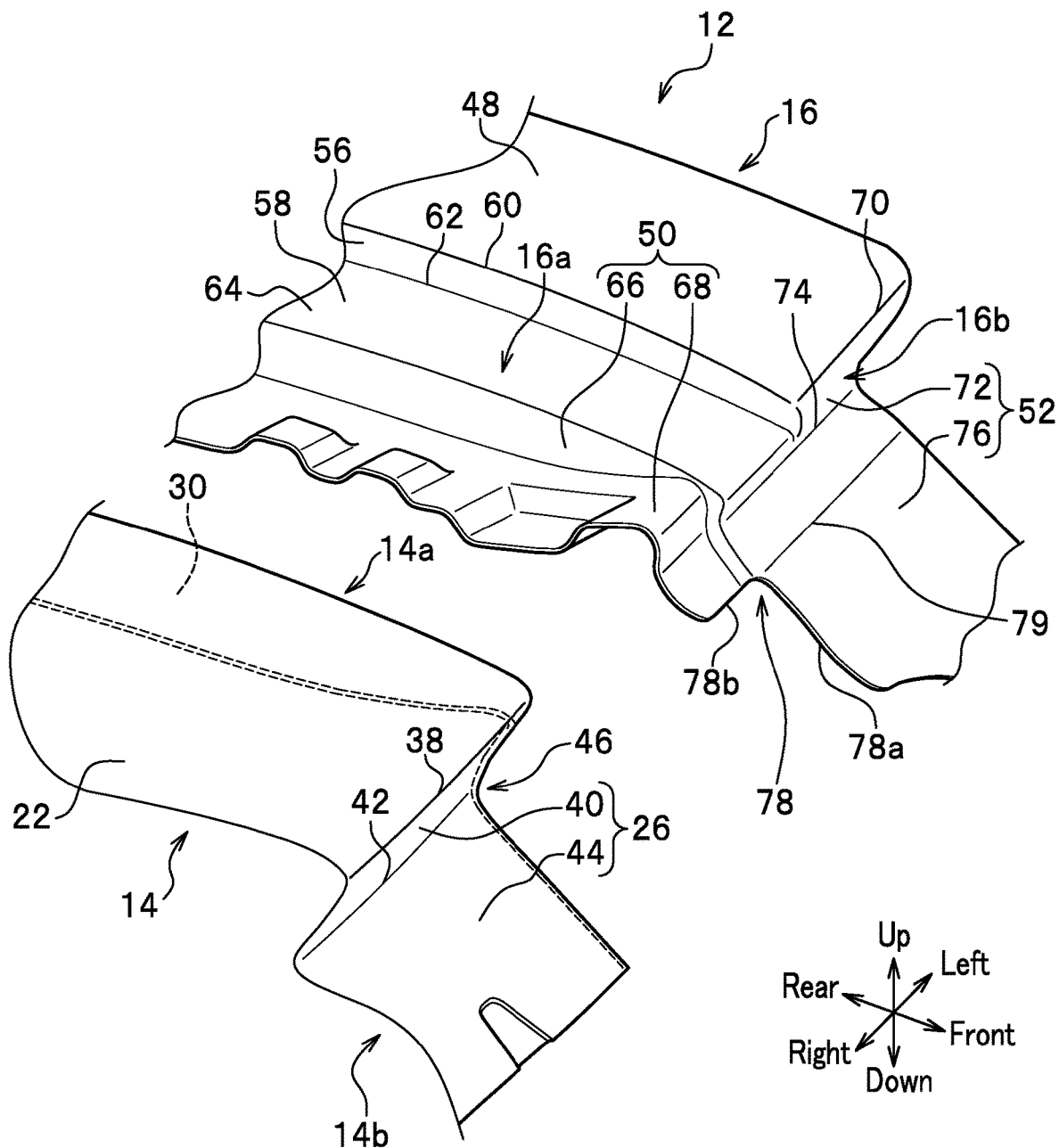
FIG. 4 is a perspective view of the roof panel and the side panel before being joined to each other.

As shown in FIG. 4, the side panel 16 has a top panel portion 48 which is an upper portion of the side panel 16 and is adjacent to the roof panel 14 when the side panel 16 and the roof panel are joined to each other, a side edge flange portion 50 which is formed at one side 16a of the side panel 16, and a side panel side vertical wall portion 52 which is formed at another side 16b intersecting with one side 16a. One side 16a of the side panel 16 is substantially perpendicular to the other side 16b of the side panel 16 near the end corner portion 20.

The top panel portion 48 extends in the vehicle front-rear direction along a left side of the vehicle body 12. An upper step portion 56 and a lower step portion 58 are continuously joined to each other and are disposed on an inner side (right side in FIG. 4), in the vehicle width direction, of the top panel portion 48. The upper step portion 56 extends continuously from an inner side, in the vehicle width direction, of the top panel portion 48 through a ridge line 60 extending in the vehicle front-rear direction and is bent substantially downward in the vertical direction (see FIG. 8). The lower step portion 58 extends continuously from a lower end of the upper step portion 56 through a ridge line 62 extending in the front-rear direction. The lower step portion 58 has a tilted surface 64 extending from the lower end portion of the upper step portion 56 and tilted downward obliquely from an outer side in the vehicle width direction to an inner side in the vehicle width direction (see FIG. 8). Moreover, the top panel portion 48, the upper step portion 56, and an upper side portion of the lower step portion 58 are exposed surfaces (design surfaces) exposed to the outside (see FIG. 8). The upper step portion 56 of the side panel 16 and the lower step portion 58 of the side panel 16 constitute a flange portion which is continuously joined to the one side 14a of the roof panel 14 (see FIG. 8).

Returning to FIG. 4, the side edge flange portion 50 has a base end portion 66 which extends continuously from the lower step portion 58 and an outer edge portion 68 which extends continuously from the base end portion 66. The base end portion 66 is bent from the lower step portion 58 and extends downward from the lower step portion 58. The outer edge portion 68 is bent from the base end portion 66 and extends inward from the base end portion 66 in the vehicle width direction.

The side panel side vertical wall portion 52 (hereafter, simply referred to as a vertical wall portion 52) is a portion to which the not-illustrated front windshield is to be attached and is a vertical wall extending downward from the other side 16b (side portion) positioned at a front end portion of a panel main body of the side panel 16 and extending in the vehicle width direction.

The vertical wall portion 52 has a base end portion 72 which extends continuously from the top panel portion 48 through a ridgeline 70 extending in the vehicle width direction, and a front edge portion 76 which extends continuously from the base end portion 72 through a ridgeline 74 extending in the vehicle width direction, and a side panel front edge side notch 78 is formed on the vertical wall portion 52. The base end portion 72 is bent from the top panel portion 48 and extends downward from the ridgeline 70 between the base end portion 72 and the top panel portion 48. The front edge portion 76 is bent from the base end portion 72 and extends forward obliquely and downward from the ridgeline 74 between the front edge portion 76 and the base end portion 72. Moreover, a ridge line 79 extending in the vehicle width direction is formed at the front edge portion 76 and positioned on a vehicle front side and frontward from the ridge line 74 (see FIG. 4).

The side panel front edge side notch 78 (hereafter, simply referred to as a notch 78) extends continuously from the outer edge portion 68 of the side edge flange portion 50 to the front edge portion 76 and is formed by partially cutting away a front edge side portion formed at the other edge 16b of the side panel 16 into a substantially rectangular shape when viewed from the vehicle front side. The notch 78 is formed on the end corner portion 20.

The notch 78 has a vertical edge portion 78a extending in the vehicle front-rear direction and a horizontal edge portion 78b extending in the vehicle width direction substantially perpendicular to the vertical edge portion 78a.

As shown in FIG. 2 and FIG. 4, the horizontal edge portion 78b, extending in the vehicle width direction, of the notch 78 is substantially aligned with the ridge line 79 of the side panel side vertical wall portion 52 (front edge portion 76). That is, the horizontal edge portion 78b and the ridge line 79 are close to each other and extend substantially parallel to each other in the vehicle front-rear direction.

Figure 6:
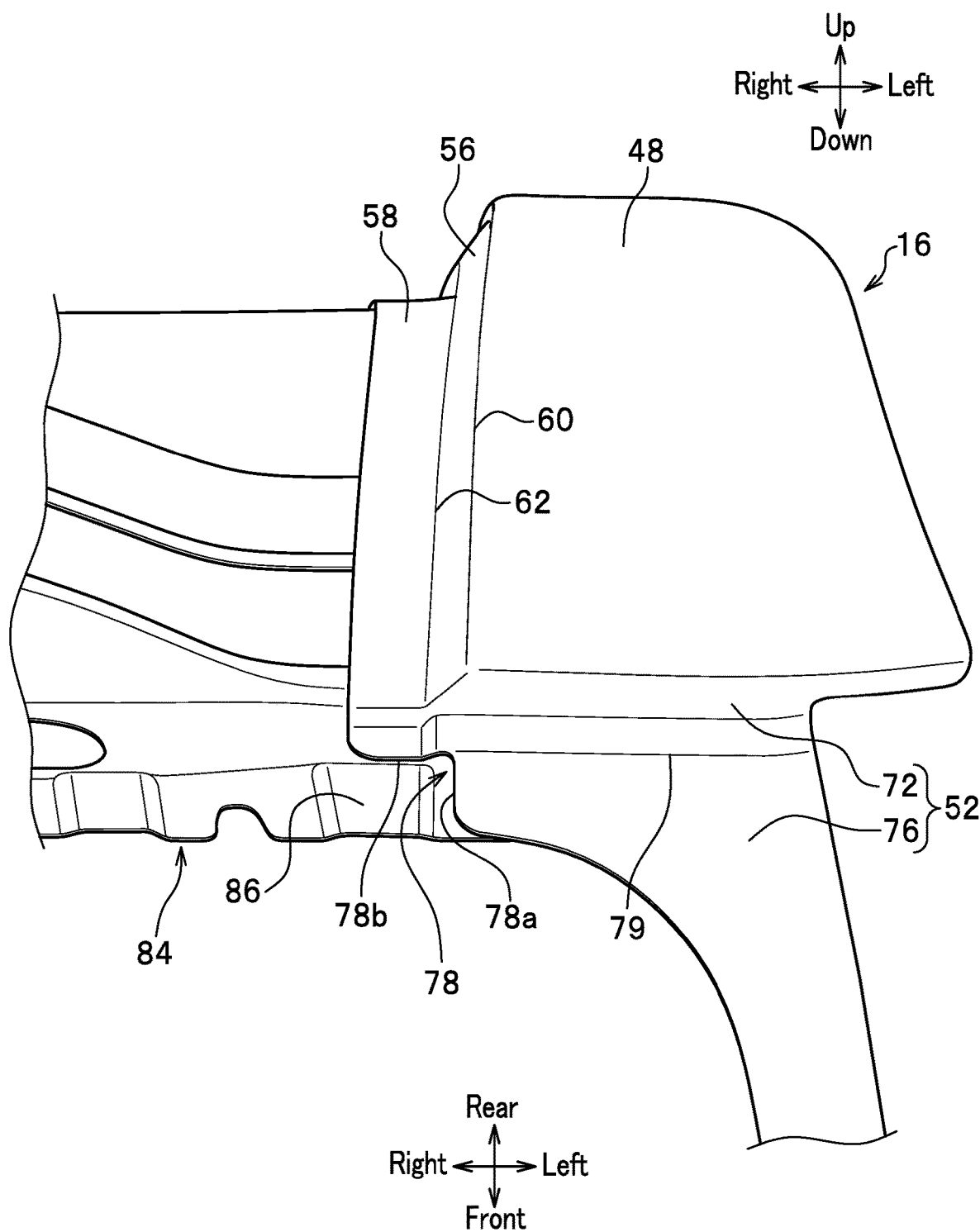
FIG. 6 is a partially enlarged perspective view of the vehicle body structure according to the present invention in order to show a positional relationship between a vertical edge portion of a notch and a ridge line.

As shown in FIG. 6, the vertical edge portion 78a, extending in the vehicle front-rear direction, of the notch 78 is positioned at substantially the same position in the vehicle width direction as the ridge line 60 between the top panel portion 48 of the side panel 16 and the upper step portion 56 of the side panel 16. That is, the vertical edge portion 78a of the notch 78 is substantially aligned in the vehicle front-rear direction with the ridge line 60 between the top panel portion 48 and the upper step portion 56.

Figure 5:
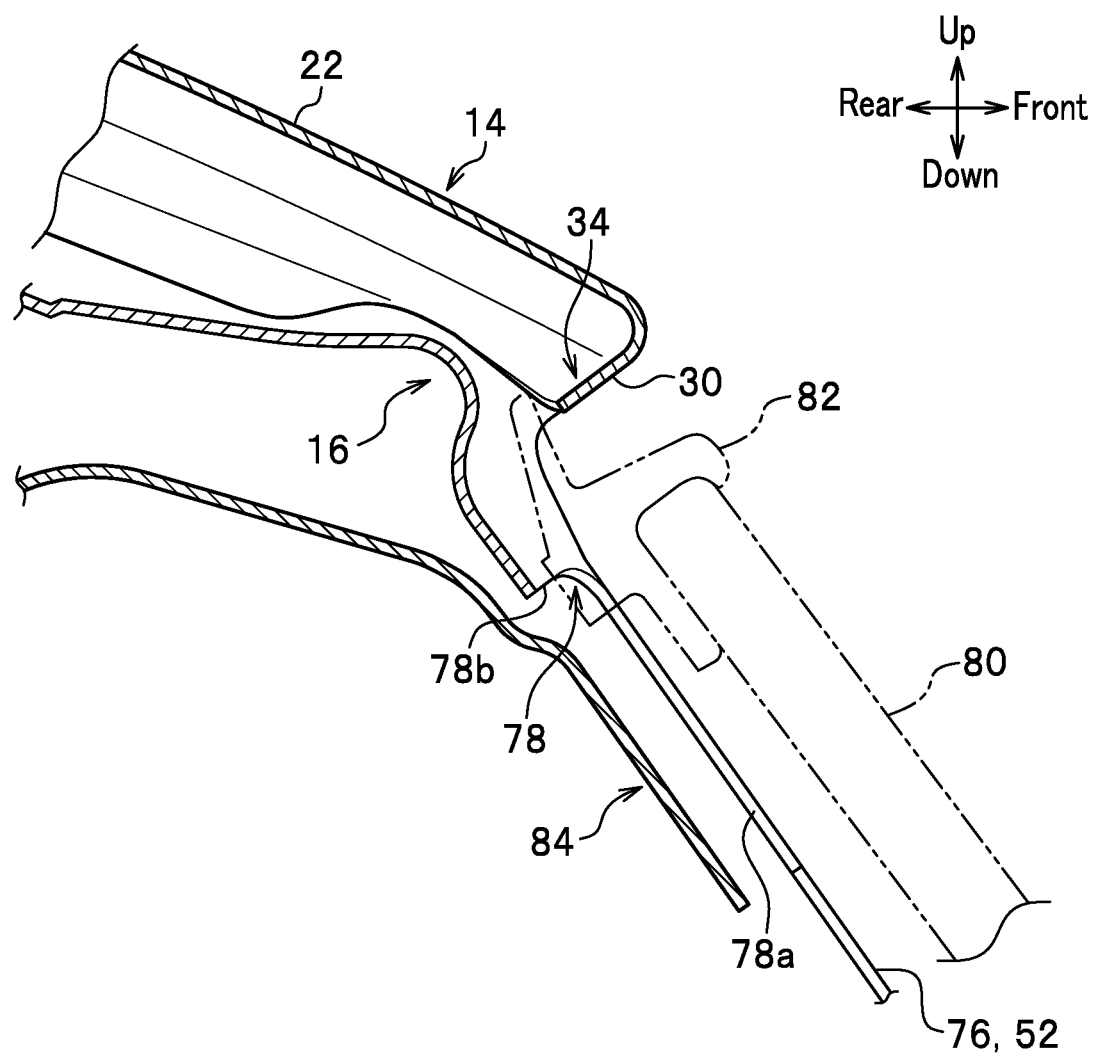
FIG. 5 is a vertical cross-sectional view when the vehicle body structure illustrated in FIG. 2 is cut along the V-V plane.

Both of the notches 46, 78 which are respectively the roof panel side notch 46 and the side panel side notch 78 are covered by a molding 82 on which an upper portion of a windshield 80 is fixed when a vehicle is manufactured (see FIG. 5). The molding 82 is disposed over a vehicle outer side of the notches 46, 78 and the molding 82 makes the notches 46, 78 less visible from a space outside of the vehicle.

In FIG. 5, the molding 82 partially covers the notch 78 and covers the entire notches 46, 78 by a not-illustrated light shielding means (for example, a non-transparent portion) provided at a side edge portion of the windshield 80. The windshield 80, the molding 82, and the not-illustrated light shielding means constitute as a whole a glass assembly.

Although an example of the present embodiment according to which the notches 46, 78, namely the roof panel side notch 46 and the side panel side notch 78 are provided respectively on the vertical wall portions 26, 52 is described, the present invention is not limited to this. At least one of the notches 78, 46 may be provided on at least one of the corresponding vertical wall portion 52 of the side panel 16 and the corresponding vertical wall portion 26 of the roof panel 14.

Figure 7:
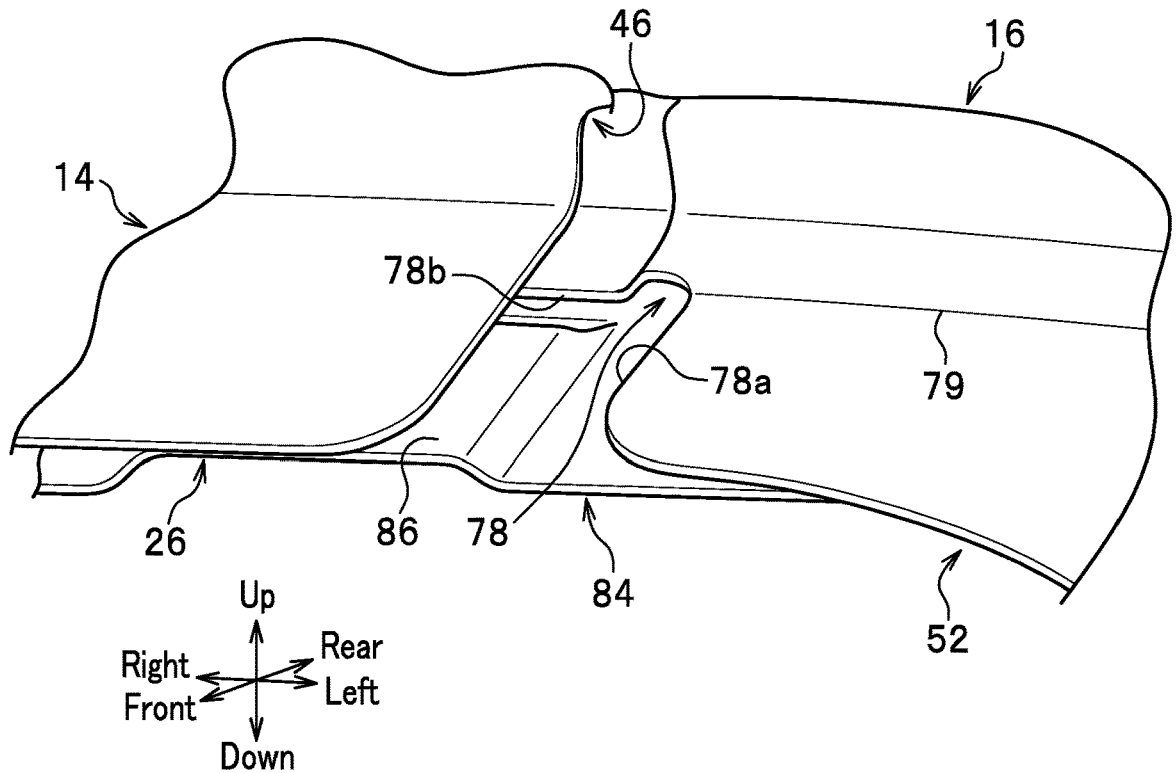
FIG. 7 is a partially enlarged perspective view of the vehicle body structure according to the present invention in order to show an exposed portion of a front roof rail.

As shown in FIG. 7, a front roof rail 84 is disposed under the roof panel 14 and the side panel 16 which respectively have the notch 46 and the notch 78. The front roof rail 84 is a member disposed under the roof panel 14 and the side panel 16 on which the notches are formed. The front roof rail 84 has an exposed portion 86 exposed on a side of the roof panel and the side panel through the roof panel side notch 46 and the side panel side notch 78. As also shown in FIG. 7, as well as FIG. 2, part of the side panel is positioned under the notch 46 formed on the roof panel, and includes an exposed portion exposed through the notch 46 to be directed to the roof panel.

The panel joined structure 10 according to the present embodiment is basically configured as described above. Next, operational advantages of the panel joined structure 10 are described.

According to the present embodiment, the notch 46 is formed on the roof panel side vertical wall portion 26 and the notch 78 is formed on the side panel side vertical wall portion 52. According to the present embodiment, this can improve formability of the end corner portions 20 so as to constitute the side edge flange portions 24, 50 which is to constitute the continuous joined portion 18 and ensure accuracy of continuous joining. That is, in a case where the end corner portions 20 of the side edge flange portions 24, 50 are bent toward the vehicle front side or the vehicle rear side in steps of forming each of the roof panel 14 and the side panel 16, the notches 46, 78 formed on the vertical wall portions 26, 52 can prevent a material of the side edge flange portions 24, 50 from being pulled and can provide excellent formability of the side edge flange portions 24, 50.

Forming the notch 78 on the vertical wall portion 52 of the side panel 16 is easier than forming the notch 46 on the vertical wall portion 26 of the roof panel 14 which is a large flat plate shaped member.

Moreover, according to the present embodiment, both of the notches 46, 78 which are respectively the roof panel side notch 46 and the side panel side notch 78 are covered by the glass assembly comprising the molding 82 to support the windshield 80. This can prevent the notches 46, 78 from being exposed to the outside and can improve design (merchantability) of the vehicle according to the present embodiment.

Furthermore, according to the present embodiment, the horizontal edge portion 78b of the notch 78 formed on the vertical wall portion 52 of the side panel 16 and the ridge line 79 formed at the vertical wall portion 52 of the side panel 16 are positioned so as to be substantially aligned with each other (see FIG. 2 and FIG. 4). That is, according to the present embodiment, the horizontal edge portion 78b, of the notch 78, with a relatively low stiffness and the ridge line 79, of the vertical wall portion 52, with a relatively high stiffness are positioned close to each other and are substantially aligned with each other. This can prevent deformation of the shape of the vertical wall portion 52 of the side panel 16 on which the notch 78 is formed when load acts on the vehicle.

Moreover, according to the embodiment, the vertical edge portion 78a of the notch 78 formed on the vertical wall portion 52 of the side panel 16 is positioned at substantially the same position, in the vehicle width direction, as the ridge line 60 between the side edge flange portion 50 and a side panel surface (see FIG. 6). According to the present embodiment, this can provide such a structure so as to minimize a decrease in the stiffness and the strength of the end corner portion 20 of the vertical wall portion 52 with providing excellent formability of the side edge flange portion 50.

According to the present embodiment, as shown in FIG. 6, the vertical edge portion 78a of the notch 78 is positioned between the ridge line 62 between the upper step portion 56 and the lower step portion 58, and the ridge line 60 between the upper step portion 56 and the top panel portion 48. According to the embodiment, because the vertical edge portion 78a of the notch 78 is positioned between the ridge lines 62, 60 with high stiffnesses, the stiffness and strength of the end corner portion of the vertical wall portion 52 can be reinforced.

Furthermore, according to the present embodiment, the front roof rail 84 is disposed under the roof panel 14 and the side panel 16 to have the exposed portion 86 of the front roof rail 84 positioned under the notches 46,78 (see FIG. 7). According to the present embodiment, this can prevent formation of a large opening on the notches 46, 78 and can fill a space between the roof panel 14, the side panel 16, and the front roof rail 84 by a not-illustrated waterproof seal. As a result, it is possible to prevent a decrease in a waterproof performance caused by the notches 46, 78 on the end corner portions 20 and to improve a waterproof effect.

EXPLANATION OF NUMERALS

10 Panel joined Structure
12 Vehicle Body
14 Roof Panel
14a One Side of Roof Panel
16 Side Panel
16a One Side of Side Panel
18 Continuous Joined Portion
20 End Corner Portion
24 Side Edge Flange Portion (Flange Portion)
26, 52 Vertical Wall Portion (Vertical Wall)
46, 78 Notch
56 Upper Step Portion (Flange Portion)
58 Lower Step Portion (Flange Portion)
78a Vertical Edge Portion (Edge Portion Extending In Vehicle Front-Rear Direction)
78b Horizontal Edge Portion (Edge Portion Extending in Vehicle Width Direction)
80 Windshield (Glass Assembly)
82 Molding (Glass Assembly)
84 Front Roof Rail (Member Disposed Under Roof Panel and Side Panel)
86 Exposed Portion

The invention claimed is:

1. A vehicle body structure of a roof panel and a side panel that are joined comprising:

a roof panel having a roof panel flange portion extending in a vehicle front-rear direction and a roof panel side portion extending in a vehicle width direction and including a roof panel vertical wall extending downward;

a side panel having a side panel flange portion extending in the vehicle front-rear direction and a side panel side portion extending in the vehicle width direction and including a side panel vertical wall extending downward;

wherein the roof panel flange portion and the side panel flange portion are continuously joined to each other, wherein a notch is formed on at least one of the roof panel vertical wall and the side panel vertical wall, and is positioned on end corner portions of the roof panel flange portion and the side panel flange portion that are continuously joined to each other, and wherein one of the roof panel and the side panel is positioned under the notch formed on the other of the roof panel and the side panel, and includes an exposed portion exposed through the notch to be directed to the other one of the roof panel and the side panel.

2. The vehicle body structure of the roof panel and the side panel that are joined according to claim 1:

wherein the notch is covered by a glass assembly.

3. The vehicle body structure of the roof panel and the side panel that are joined according to claim 1:

wherein an edge portion, extending in the vehicle width direction, of the notch is substantially aligned with a ridge line formed at the roof panel vertical wall or the side panel vertical wall, either of which the notch is formed on.

4. The vehicle body structure of the roof panel and the side panel that are joined according to claim 1:

wherein an edge portion, extending in the vehicle front-rear direction, of the notch is positioned at substantially the same position in the vehicle width direction as a ridge line between the roof panel flange portion or the side panel flange portion, either of which the notch is formed on and an upper surface of the roof panel or the side panel, either of which the notch is formed on.

5. The vehicle body structure of the roof panel and the side panel that are joined according to claim 4:

wherein the notch is formed on the side panel; and wherein an edge portion, extending in the vehicle front-rear direction, of the notch is positioned at substantially the same position in the vehicle width direction as the ridge line between the side panel flange portion and the upper surface of the side panel.

* * * * *